US007107204B1

(12) United States Patent
Liu et al.

(10) Patent No.: US 7,107,204 B1
(45) Date of Patent: Sep. 12, 2006

(54) COMPUTER-AIDED WRITING SYSTEM AND METHOD WITH CROSS-LANGUAGE WRITING WIZARD

(75) Inventors: Ting Liu, Beijing (CN); Ming Zhou, Beijing (CN); Jian Wang, Zheijiang Province (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/556,229

(22) Filed: Apr. 24, 2000

(51) Int. Cl.
*G06F 17/28* (2006.01)

(52) U.S. Cl. ................... 704/2; 704/8; 704/9; 704/270; 715/531; 715/533; 715/536

(58) Field of Classification Search ................ 704/9, 704/1–5, 8, 270–277; 715/531, 533, 536; 434/157
See application file for complete search history.

(56) References Cited

U.S. PATENT DOCUMENTS

| 4,565,459 | A | * | 1/1986 | DiLucia ........................ 400/110 |
| 4,679,951 | A | * | 7/1987 | King et al. ................... 400/110 |
| 5,164,900 | A | * | 11/1992 | Bernath ........................ 715/535 |
| 5,212,638 | A | * | 5/1993 | Bernath ........................ 715/535 |
| 5,319,552 | A | | 6/1994 | Zhong |
| 5,418,718 | A | | 5/1995 | Lim et al. |
| 5,535,119 | A | | 7/1996 | Ito et al. |
| 5,615,296 | A | * | 3/1997 | Stanford et al. .......... 704/270.1 |
| 5,787,230 | A | * | 7/1998 | Lee ............................. 704/235 |
| 5,893,133 | A | * | 4/1999 | Chen ........................... 715/535 |
| 5,903,861 | A | * | 5/1999 | Chan ............................ 704/9 |

(Continued)

FOREIGN PATENT DOCUMENTS

EP 0 555 545 8/1993

(Continued)

OTHER PUBLICATIONS

Kataoka et al., "A Model for Input and Output of Multilingual Text in a Windowing Environment", ACM Transactions on Information Systems, vol. 10, No. 4, Oct. 1992, pp. 438-451, New York, US.

*Primary Examiner*—Vijay Chawan
(74) *Attorney, Agent, or Firm*—Lee & Hayes, PLLC

(57) ABSTRACT

A computer-aided writing system offers assistance to a user writing in a non-native language, as the user needs help, without requiring the user to divert attention away from the entry task. The writing system provides a user interface (UI) that integrates writing assistance with in-line text entry. When the user is unsure of a word's spelling or whether the word is appropriate, the user may enter a corresponding native word directly in line with the ongoing sentence. An error tolerant spelling tool accepts the native word (even if it is misspelled or mistyped) and derives the most probable non-native word for the given context. The spelling tool consults a bilingual dictionary to determine possible non-native word translation candidates, a non-native language model (e.g., a trigram language model) to generate probabilities associated with the candidates given the current sentence or phrase context, and a translation model to generate probabilities of how likely a certain native word was intended given the non-native word candidates. From these probabilities, the spelling tool determines the most probable non-native word translation and substitutes the non-native word for the native input string. If the user likes the non-native word, the user may simply continue with the sentence. On the other hand, if the user is still unsure of the non-native word, the user can invoke a sentence recommendation tool that allows the user to see the non-native word in a bilingual sentence pair to learn how the word can be used.

69 Claims, 10 Drawing Sheets

Fig. 4

U.S. PATENT DOCUMENTS

| | | | |
|---|---|---|---|
| 6,014,615 A * | 1/2000 | Chen | 704/3 |
| 6,067,520 A * | 5/2000 | Lee | 704/270 |
| 6,073,146 A * | 6/2000 | Chen | 715/535 |
| 6,292,768 B1 * | 9/2001 | Chan | 704/1 |
| 6,385,569 B1 * | 5/2002 | Kutsumi | 704/7 |
| 6,408,266 B1 * | 6/2002 | Oon | 704/1 |

FOREIGN PATENT DOCUMENTS

| | | |
|---|---|---|
| WO | 95/17729 | 6/1995 |
| WO | 98/58329 | 12/1998 |

* cited by examiner

COMPUTER-AIDED WRITING SYSTEM AND METHOD WITH CROSS-LANGUAGE WRITING WIZARD

TECHNICAL FIELD

The present invention relates to a machine-aided writing systems and methods. More particularly, the present invention relates to a language input user interface and underlying architecture that facilitates entry of multiple languages and assists users with entry of non-native languages.

BACKGROUND

With the rapid development of the Internet, computer users all over the world are becoming increasingly familiar with writing English. Unfortunately, for some societies that possess significantly different cultures and writing styles, the ability to write in English is an ever-present barrier. This is not due to lack of knowledge, as research suggests that many non-English users have sufficient knowledge of English to easily discriminate between a sentence written in native-English and a sentence written in broken English. English is used an example, but the problem persists across other language boundaries.

Consider the plight of a Chinese user. Typically, when a Chinese user wants to write an English word/phrase in which he is unfamiliar with its spelling or usage, the user usually looks up the word/phrase in a Chinese-English dictionary. If the dictionary is an electronic dictionary, the user must input the Chinese word/phrase via some input mechanism. This process suffers three shortcomings. First, it is not convenient for a Chinese user to input a Chinese word/phrase. Second, forcing the user to enter a Chinese word/phrase interrupts the user's train of thought when writing in English. Third, as a non-native speaker of English, it is difficult for a Chinese user to select a suitable word from the dictionary.

Accordingly, there is a need for a machine-aided writing system that helps non-English users with spelling, grammar, and writing as a native-English user. As envisioned by the inventors, such a machine-aided writing system should act as a consultant that provides various kinds of help whenever necessary, and allows the users to control the writing. Such a system might provide spelling help to assist users with hard-to-spell words and simultaneously check the usage in a certain context. The machine-aided writing system might further provide some form of sentence help to let users refine the writing by providing perfect example sentences.

Several machine-aided approaches have been proposed. The approaches typically fall into two categories: (1) automatic translation, and (2) translation memory. Both work at the sentence level. The former attempts to automatically translate sentences entered by the user into sentences that are grammatically and stylistically correct. However, the quality of fully automatic machine translation in the current system is not completely satisfactory because a significant amount of manual editing is needed following such translation to ensure the high quality. The translation memory approach works like a case-based system in that, given a sentence, the system retrieves similar sentences from a translation example database. The user then translates the subject sentence by analogy.

While both approaches offer some advantages, there remains room to improve the user experience with computer-aided writing systems. More particularly, there is a need for a computer-aided writing system that allows non-English user to collaborate with the computer in a way that achieves the highest quality writing with less brute force effort.

SUMMARY

A computer-aided writing system offers assistance to a user writing in a non-native language, as the user needs help, without requiring the user to divert attention away from the entry task. The writing system provides a user interface (UI) that integrates writing assistance with normal text entry. The writing system provides assistance to users who are having difficulty spelling a non-native word or selecting the appropriate word for a given context. The writing system also provides sample sentence structures to demonstrate how words are used and how sentences are properly crafted.

In the described implementation, the writing system is implemented as a writing wizard for a word-processing program. The writing wizard is exposed via a graphical UI that allows the user to enter words in a non-native language. When the user is unsure of a word's spelling or whether the word is appropriate, the user may enter a corresponding native word directly in line with the ongoing sentence.

An error tolerant spelling tool accepts the native word (even if it is misspelled or mistyped) and attempts to derive the most probable non-native word for the given context. The spelling tool utilizes a bilingual dictionary to determine possible non-native word translation candidates. These candidates are passed to a non-native language model (e.g., a trigram language model) and a translation model. The non-native language model generates probabilities associated with the candidates given the current sentence or phrase context. The translation model generates probabilities of how likely a native word is intended given the non-native word candidates. From these probabilities, the spelling tool determines the most probable non-native word translation. The writing wizard substitutes the non-native word for the native input string. To the user, the substitution takes place almost immediately after entering the native input string.

If the user likes the non-native word, the user may simply continue with the sentence. On the other hand, if the user is still unsure of the non-native word, the user can invoke more assistance from the writing wizard. For instance, the writing wizard has a sentence recommendation tool that allows the user to see the non-native word in a sentence context to learn how the word can be used. A window containing example bilingual sentence pairs is presented to the user so that the user can learn how the non-native word is used in the sentence and see the corresponding sentence written in the native language. In addition, the wizard can present a list of other native word translations of the input string, as well as a list of other non-native word candidates. The user can select any one of these words and review the selected word in a sample pair of bilingual sentences. In this manner, the spelling tool and sentence recommendation tool work together in a unified way to greatly improve the productivity of writing in a non-native language.

BRIEF DESCRIPTION OF THE DRAWINGS

The same numbers are used throughout the Figures to reference like components and features.

FIG. 5 illustrates an in-line input feature of the UI.

DETAILED DESCRIPTION

A computer-aided writing system helps a user write in a non-native language by offering consultation assistance for spelling and sentence structure. The writing system implements a statistical spelling tool that assists in spelling and a sentence recommendation tool that intelligently recommends example sentences. The tools are exposed through a user interface as an integrated mechanism that highly improves the productivity of writing in a non-native language.

The writing system and methods are described as helping non-English users write in English. In particular, one exemplary implementation used throughout this disclosure for illustration purposes is directed to a Chinese user who is writing in English. However, the principles and concepts described herein may be readily ported to other languages and users of other nationalities.

For discussion purposes, the computer-aided writing system is described in the general context of word processing programs executed by a general-purpose computer. However, the computer-aided writing system may be implemented in many different environments other than word processing (e.g., email systems, browsers, etc.) and may be practiced on many diverse types of devices.

System Architecture

Figure 1:
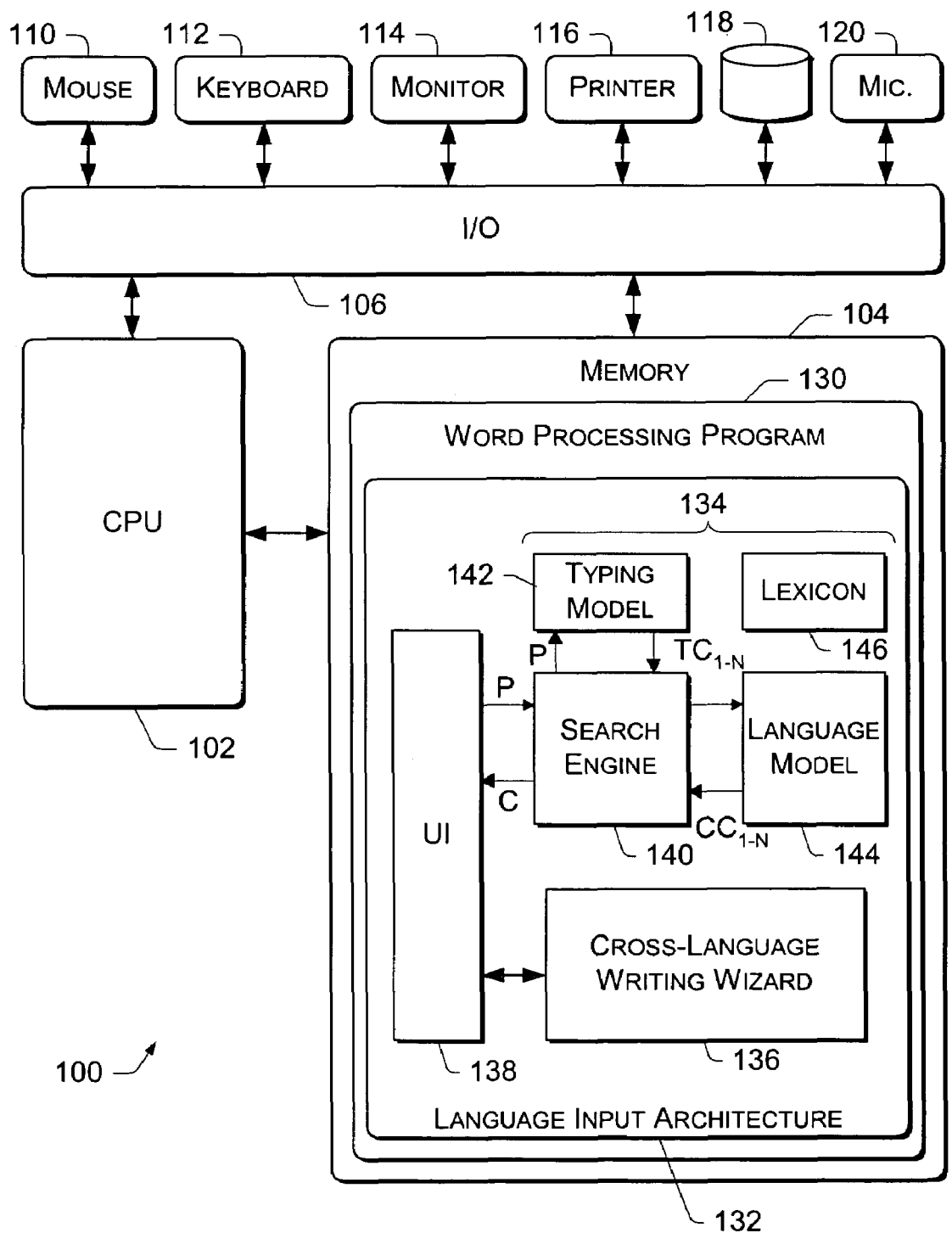
FIG. 1 is a block diagram of a computer system that implements a writing system with a cross-language writing wizard.

FIG. 1 shows an exemplary computer system 100 having a central processing unit (CPU) 102, a memory 104, and an input/output (I/O) interface 106. The CPU 102 communicates with the memory 104 and I/O interface 106. The memory 104 is representative of both volatile memory (e.g., RAM) and non-volatile memory (e.g., ROM, hard disk, etc.). Programs, data, files, and may be stored in memory 104 and executed on the CPU 102.

The computer system 100 has one or more peripheral devices connected via the I/O interface 106. Exemplary peripheral devices include a mouse 110, a keyboard 112 (e.g., an alphanumeric QWERTY keyboard, a phonetic keyboard, etc.), a display monitor 114, a printer 116, a peripheral storage device 118, and a microphone 120. The computer system may be implemented, for example, as a general-purpose computer. Accordingly, the computer system 100 implements a computer operating system (not shown) that is stored in memory 104 and executed on the CPU 102. The operating system is preferably a multi-tasking operating system that supports a windowing environment. An example of a suitable operating system is a Windows brand operating system from Microsoft Corporation.

It is noted that other computer system configurations may be used, such as hand-held devices, multiprocessor systems, microprocessor-based or programmable consumer electronics, network PCs, minicomputers, mainframe computers, and the like. In addition, although a standalone computer is illustrated in FIG. 1, the language input system may be practiced in distributed computing environments where tasks are performed by remote processing devices that are linked through a communications network (e.g., LAN, Internet, etc.). In a distributed computing environment, program modules may be located in both local and remote memory storage devices.

The computer system 100 implements a writing system that serves two functions: (1) language conversion and (2) assisting writing in non-native languages. The first function is to receive input strings (e.g., phonetic text) and convert the input strings automatically to output strings (e.g., language text). The conversion process is tolerant to spelling and entry errors. The second function is to aid users in writing words and sentences in non-native languages by offering spelling assistance and guidance as to correct sentence structure and style.

The writing system is implemented in FIG. 1 as a data or word processing program 130 stored in memory 104 and executed on CPU 102. The word processing program 130 implements a language input architecture 132 that performs the language conversion and writing assistance. The language input architecture 132 has a conversion system 134 to perform the conversion function and a cross-language wizard 136 to assist the user when entering non-native text. The conversion system 134 and cross-language wizard 136 are exposed via a unified user interface (UI) 138. The word processing program 130 may include other components in addition to the architecture 132, but such components are considered standard to word processing programs and will not be shown or described in detail.

Conversion System 134

The conversion system 134 converts input strings in one form (e.g., phonetic text characters) to an output string of another form (e.g., language text characters). It includes a search engine 140, one or more typing models 142, a language model 144, and one or more lexicons 146 for various languages. The architecture 132 is language independent. The UI 138 and search engine 140 are generic and can be used for any language. The architecture 132 is adapted to a particular language by changing the language model 144, the typing model 142 and the lexicon 146.

The user enters an input string via one or more of the peripheral input devices, such as the mouse 110, keyboard 112, or microphone 120. In this manner, a user is permitted to input phonetic information using keyed entry or oral speech. In the case of oral input, the computer system may further implement a speech recognition module (not shown) to receive the spoken words and convert them to phonetic text. The following discussion assumes that entry of text via keyboard 112 is performed on a full size, standard alphanumeric QWERTY keyboard.

The UI 138 displays the input string as it is being entered. The UI 138 is preferably a graphical user interface. A more detailed discussion of the UI 138 is found in the above-referenced U.S. patent application Ser. No. 09/606,811, entitled "Language Input User Interface". As one example, the input string contains phonetic text or a mixture of phonetic and non-phonetic text. "Phonetic text" generally refers to an alphanumeric text representing sounds made when speaking a given language. "Non-phonetic text" is alphanumeric text that does not represent sounds made when speaking a given language. Non-phonetic text might include punctuation, special symbols, and alphanumeric text representative of a written language other than the language text.

The conversion system 134 converts the phonetic text to language text. A "language text" is the characters and non-character symbols representative of a written language. Perhaps more generally stated, phonetic text may be any alphanumeric text represented in a Roman-based character set (e.g., English alphabet) that represents sounds made when speaking a given language that, when written, does not employ the Roman-based character set. Language text is the written symbols corresponding to the given language.

For discussion purposes, word processor 130 is described in the context of a Chinese-based word processor and the language input architecture 132 is configured to convert Pinyin to Hanzi. That is, the phonetic text is Pinyin and the language text is Hanzi. However, the language input architecture is language independent and may be used for other languages. For example, the phonetic text may be a form of spoken Japanese (hiragana, katakana), whereas the language text is representative of a Japanese written language, such as Kanji. Many other examples exist including, but not limited to, Arabic languages, Korean language, Indian language, other Asian languages, and so forth.

The user interface 138 passes the phonetic text (P) to the search engine 140, which in turn passes the phonetic text to the typing model 142. The typing model 142 generates various typing candidates ($TC_1, \ldots, TC_N$) that might be suitable edits of the phonetic text intended by the user, given that the phonetic text may include errors. The typing model 142 returns multiple typing candidates with reasonable probabilities to the search engine 140, which passes the typing candidates onto the language model 144. The language model 144 evaluates the typing candidates within the context of the ongoing sentence and generates various conversion candidates ($CC_1, \ldots, CC_N$) written in the language text that might be representative of a converted form of the phonetic text intended by the user. The conversion candidates are associated with the typing candidates.

Conversion from phonetic text to language text is not a one-for-one conversion. The same or similar phonetic text might represent a number of characters or symbols in the language text. Thus, the context of the phonetic text is interpreted before conversion to language text. On the other hand, conversion of non-phonetic text will typically be a direct one-to-one conversion wherein the alphanumeric text displayed is the same as the alphanumeric input.

The conversion candidates ($CC_1, \ldots, CC_N$) are passed back to the search engine 140, which performs statistical analysis to determine which of the typing and conversion candidates exhibit the highest probability of being intended by the user. Once the probabilities are computed, the search engine 140 selects the candidate with the highest probability and returns the language text of the conversion candidate to the UI 138. The UI 138 then replaces the phonetic text with the language text of the conversion candidate in the same line of the display. Meanwhile, newly entered phonetic text continues to be displayed in the line ahead of the newly inserted language text.

If the user wishes to change language text from the one selected by the search engine 140, the user interface 138 presents a first list of other high probability candidates ranked in order of the likelihood that the choice is actually the intended answer. If the user is still dissatisfied with the possible candidates, the UI 138 presents a second list that offers all possible choices. The second list may be ranked in terms of probability or other metric (e.g., stroke count or complexity in Chinese characters).

Cross-Language Wizard 136

The word processing program 130 may alternatively, or additionally, be used to write primarily in a non-native language. The cross-language writing wizard 136 lends the support needed to write effectively in the non-native language. The user enters the non-native language via UI 138. When the user is unsure how to write a word or phrase, the user may enter the word in his/her native language. The writing wizard 136 recognizes the different language input and offers effective help without diverting the user's attention from the entry task. The wizard provides spelling assistance and recommends sentence structures and styles as a way to improve the user's writing.

Suppose, for example, a Chinese user wants to write text in English. The user writes an English sentence in an entry area presented by the UI 138. When the user is unsure how to express a thought in English, the user may decide to write in familiar Chinese Pinyin. The writing wizard 136 recognizes the Pinyin input, and translates the Pinyin into the most suitable English word immediately. The correlative Chinese word will be shown beside the English word for the user's reference. If the user thinks the English word is not quite right, the user may request other English words related to the Chinese Pinyin. If the user is not sure which English word is best in this context, the user may browse Chinese-English bilingual sentence examples in which the Chinese word and the English word are presented together. The context information helps the user decide which word is the best fit for the present context. In addition, the user can input a Chinese sentence pattern directly, and select an appropriate English sentence type by browsing bilingual sentence examples.

Exemplary Writing Wizard Architecture

Figure 2:
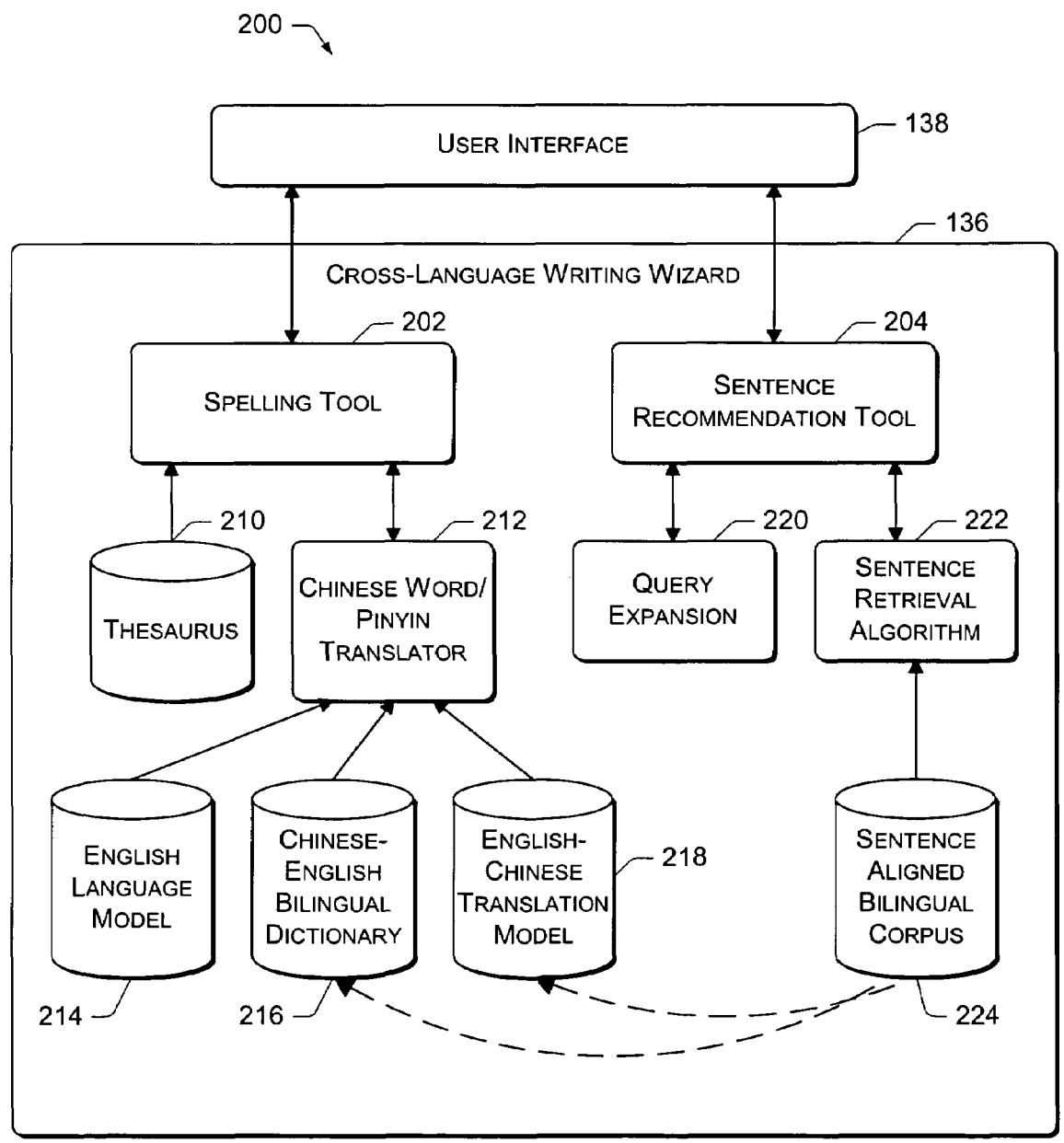
FIG. 2 is a block diagram of a software architecture of the cross-language writing wizard.

FIG. 2 illustrates an exemplary writing wizard architecture 200 that integrates the user interface 138 and the writing wizard 136. The writing wizard architecture 200 allows a user to enter characters in one or more languages via the UI 138 and offers help when the user needs it without diverting the user's attention away from the entry area.

The writing wizard 200 has a spelling tool 202 to provide spelling assistance on the word or phrase level and a sentence recommendation tool 204 to offer helpful suggestions regarding sentence structure. The tools 202 and 204 work together to provide assistance as needed by the user. Again, for discussion purposes, the tools are described in the context of a Chinese user writing in English. However, the tools may be implemented in any combination of languages.

Spelling Tool 202

The spelling tool 202 performs two primary functions. The first function is to offer a synonym or antonym associated with the English word entered by the user. The spelling tool accesses an English thesaurus 210 to retrieve the synonym or antonym of the English word.

The second function of spelling tool 202 is translate a native word entered by the user to a non-native word. The spelling tool provides a translator 212 that automatically converts an entered string to a native word familiar to the user. For instance, a Chinese user may input a Pinyin string and the translator 212 converts the Pinyin to a Chinese word in Hanzi characters. The translator 212 may be implemented to include a polyphone model that expands Pinyin possibilities for a Chinese word (e.g., Chinese word '乐' has two pinyin sets "le" and "yue"), a fault tolerance model that accepts misspellings and entry errors, and a simplified Pinyin model (e.g., allows user to input "hj" for "huanjing").

Following the initial form conversion, the translator 212 then translates the native word to a suitable non-native word that may be used in the ongoing sentence. In the illustrated implementation involving a Chinese-English writing system, the translator 212 uses three models to provide the translation: (1) an English language model 214, (2) a Chinese-English bilingual dictionary 216, and (3) an English-Chinese translation model 218.

The Chinese English bilingual dictionary 216 contains Chinese words and their corresponding English translations to provide possible English word translation candidates for the Chinese word. As an example, the dictionary 216 might include approximately 115,000 Chinese words and corresponding English translations. The dictionary 216 may also include other information, such as part-of-speech, semantic classification, and so forth.

The English language model 214 generates probabilities associated with the English word candidates given the current sentence or phrase context. In one implementation, the English language model 214 is a statistical N-gram model, such as the N-gram Markov model, which is described in "Statistical Methods for Speech Recognition", by Frederick Jelinek, The MIT Press, Cambridge, Mass., 1997. As one suitable example, the English language model 214 can be constructed as a tri-gram model (i.e., N=3) that employs approximately 240,000,000 tri-grams and a vocabulary with 58,000 words.

The English-Chinese translation model 218 generates probabilities of how likely a Chinese word is intended given each of the English word candidates. In one implementation, the English-Chinese translation model 218 is a statistical model that is trained from a word-aligned bilingual corpus, which may be derived from corpus 224 (described below). The translation model 218 may be a trigram model if the training bilingual corpus is sufficiently large; otherwise, a bigram or unigram translation model may be used. Chinese sentences are segmented before word translation training because written Chinese consists of a character stream without spaces between words. Prior to training, a wordlist is used in conjunction with an optimization procedure to segment the sentences. One example of a suitable optimization procedure is described in an article written by Jianfeng Gao, Han-Feng Wang, Mingjing Li, and Kai-Fu Lee, entitled "A unified approach to statistical language modeling for Chinese", IEEE, ICASPP2000, 2000.

After segmentation, the bilingual training process trains on the words. One suitable process is based on an iterative EM (expectation-maximization) procedure for maximizing the likelihood of generating an English word given a Chinese character or word. The output of the training process is a set of potential English translations for each Chinese word, together with the probability estimate for each translation. One suitable EM procedure is described in an article by Brown. P. F., Jennifer C. Lai, and R. L. Merce, entitled "Aligning sentences in parallel corpora", In *Proceedings of the 29th Annual Conference of the Association for Computational Linguistics,* 169–176, Berkeley, 1991.

The translator 212 uses the probabilities returned from the English language model 214 and the English-Chinese translation model 218 to determine the English word candidate with the highest probability of being the word intended by the user given the Pinyin string within the sentence context. The writing wizard 136 passes the optimal word back to the UI 138, which substitutes the English word for the Chinese Pinyin input string. To the user, the English word is almost immediately substituted after the Pinyin string is entered.

To further demonstrate the spelling tool 204, suppose that a Chinese user inputs two English words $EW_1$ and $EW_2$ and then becomes unsure of how to spell or phrase the next word in English. The Chinese user enters a Pinyin string PY that expresses the user's intention. The spelling tool 202 passes the string PY to the translator 212, which looks up all candidate Chinese words from a Pinyin-Chinese dictionary.

Figure 3:
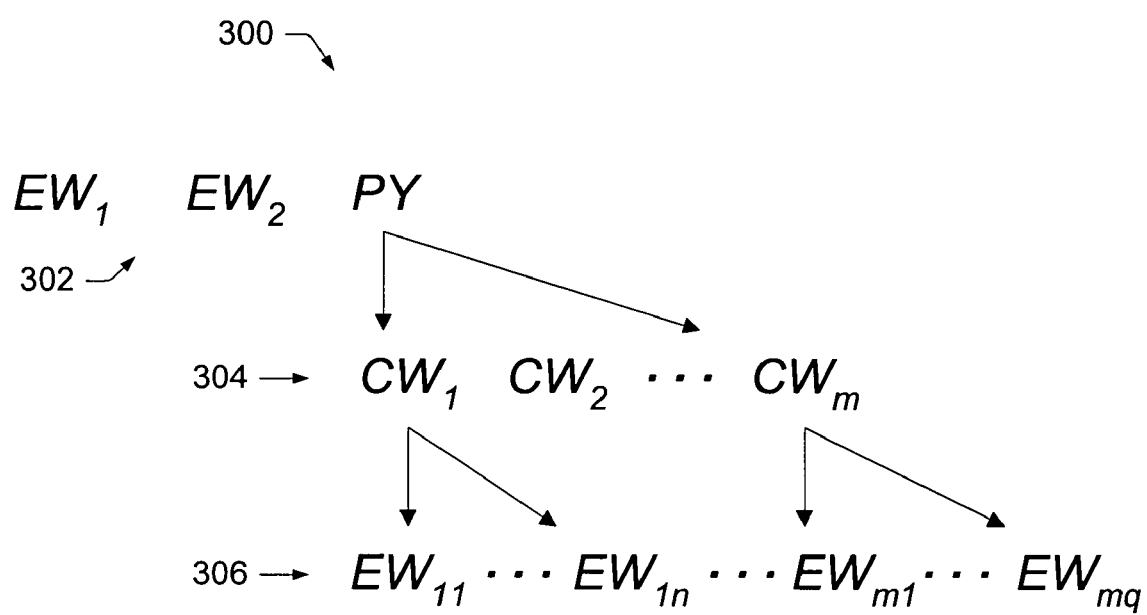
FIG. 3 is an illustration of a word-level translation between words in a first language and words in a second language.

FIG. 3 shows the word-level Pinyin-English translation 300. The first row 302 shows the user-entered English words $EW_1$ and $EW_2$ and Pinyin PY. In the second row 304, the Pinyin string is translated to multiple Chinese words $CW_1$, $CW_2, \ldots, CW_m$. The translator 212 then obtains a list of candidate English translations from the Chinese English bilingual dictionary 216 for each of the Chinese words $CW_1$, $CW_2, \ldots, CW_m$. The third row 306 shows the English words $EW_{11}, \ldots, EW_{1n}$ for the first Chinese word $CW_1$ and English words $EW_{m1}, \ldots, EW_{mq}$ for the last Chinese word $CW_m$.

The candidate English words in row 306 are initially returned in their original or root form and may not fit the context of the sentence. The translation model expands each word to other morphological forms. For instance, the root "go" is expanded to inflections such as "went", "goes", "going", and "gone".

From the candidate list, the translator 212 attempts to select the best English word in this specified contextual condition and present that word to the user. The translator compares the probabilities of all English words in row 306 of FIG. 3 and selects the English word with the highest probability as the most proper translation of the Pinyin input string PY. This can be expressed statistically as the probability that English word candidate $EW_{ij}$ was intended by the user given the actual entry of PY, $EW_1$, and $EW_2$, which is written as follows:

$$\arg\max_{EW_{ij}} P(EW_{ij} \mid EW_1, EW_2, PY)$$

According to Bayes law, the conditional probability is estimated as follows:

$$P(EW_{ij} \mid EW_1, EW_2, PY) = \tag{1}$$
$$\frac{P(PY \mid EW_1, EW_2, EW_{ij}) \times P(EW_{ij} \mid EW_1, EW_2)}{P(PY \mid EW_1, EW_2)}$$

Since the denominator is independent of $EW_{ij}$ and the same for all situations, the denominator may be omitted, leaving the following relationship:

$$P(EW_{ij} \mid PY, EW_1, EW_2) \alpha P(PY \mid EW_{ij}, EW_1, EW_2) \times P(EW_{ij} \mid EW_1, EW_2) \tag{2}$$

Introducing a Chinese word $CW_i$ into the term, $P(PY \mid EW_{ij}, EW_1, EW_2)$, yields the following:

$$P(PY \mid EW_1, EW_2, EW_{ij}) = \tag{3}$$
$$\frac{P(CW_i \mid EW_1, EW_2, EW_{ij}) \times P(PY \mid CW_i, EW_1, EW_2, EW_{ij})}{P(CW_i \mid PY, EW_1, EW_2, EW_{ij})}$$

For simplicity, the following assumptions are made:

$$P(CW_i \mid EW_1, EW_2, EW_{ij}) \approx P(CW_i \mid EW_{ij})$$

$$P(PY \mid CW_i, EW_1, EW_2, EW_{ij}) \approx P(PY \mid CW_i)$$

$$P(CW_i \mid PY, EW_1, EW_2, EW_{ij}) \approx 1$$

The assumptions permit an approximation of formula (3) as follows:

$$P(PY \mid EW_1, EW_2, EW_{ij}) = P(CW_i \mid EW_{ij}) \times P(PY \mid CW_i) \tag{4}$$

Combining formulas (2) and (4) provides:

$$P(EW_{ij} \mid PY, EW_1, EW_2) = P(CW_i \mid EW_{ij}) \times P(PY \mid CW_i) \times P(EW_{ij} \mid EW_1, EW_2) \tag{5}$$

where the term $P(CW_i \mid EW_{ij})$ is the English-Chinese translation model 218, the term $P(PY \mid CW_i)$ is a polyphone model, which is set to 1, and the term $P(EW_{ij} \mid EW_1, EW_2)$ is the English tri-gram language model 214.

Accordingly, the original goal for the spelling tool may be restated as finding the most probable translation of the Pinyin string PY by retrieving the English word with the highest conditional probability.

$$\arg\max_{EW_{ij}} P(EW_{ij} \mid EW_1, EW_2, PY) \approx$$
$$\arg\max_{EW_{ij}} P(CW_i \mid EW_{ij}) \times P(EW_{ij} \mid EW_1, EW_2)$$

Sentence Recommendation Tool 204

The sentence recommendation tool 204 operates at the sentence level to suggest possible sentences to assist the user in writing phrases and sentences correctly in a non-native language. When the user needs assistance, the user enters via UI 138 a sequence of keywords or a short phrase that attempts to convey the essence of the intended sentence. The sentence recommendation tool 204 employs a query expansion 220 to expand the query to relevant alternative expressions. The sentence recommendation tool 204 passes the expanded query to a sentence retrieval algorithm 222, which searches a large bilingual corpus 224. The sentence retrieval algorithm 222 returns one or more pairs of bilingual sentences expressing meanings relevant to the user's query or having syntactical relevance. The sentence pairs include the sentence written in the native language and the corresponding sentence properly written in the non-native language.

The bilingual corpus 224 may be constructed in many ways. One approach is to collect sentence pairs from various online and offline sources, such as World Wide Web bilingual sites, dictionaries, books, bilingual news and magazines, and product manuals. As one example, the size of the bilingual corpus constructed by the inventors contains 96,362 sentence pairs. In the FIG. 2 architecture, the corpus 224 is used for the following three tasks:

(1) Act as translation memory to support the sentence recommendation tool 204.

(2) Support English-Chinese translation model 218 at word and phrase level.

(3) Extract bilingual terms to enrich the Chinese-English bilingual dictionary 216.

To construct a sentence-aligned bilingual corpus, an alignment algorithm automatically aligns sentences in the corpus and the results are corrected manually. Various alignment algorithms may be used, such as lexically based techniques and statistical techniques. Lexically based techniques use extensive online bilingual lexicons to match sentences, whereas statistical techniques require almost no prior knowledge and are based solely on the lengths of sentences.

One unique approach to constructing a sentence-aligned bilingual corpus is to incorporate both lexically based and statistical techniques. The statistical technique is first used to obtain a preliminary result. Then, anchors are identified in the text to reduce complexity. An anchor is defined as a block that consists of n successive sentences. Experiments indicate that best performance is achieved when n=3. Finally, a small, restricted set of lexical cues is applied to the anchors for further improvement.

Once the sentence-aligned bilingual corpus 224 is constructed, it may be used to enrich the Chinese-English bilingual dictionary 216. Two steps are made to extract bilingual terms from the sentence-aligned corpus 224. First, Chinese monolingual terms are extracted from the Chinese portion of the corpus 224. One method for this extraction is in an article by Lee-Feng Chien, entitled "PAT-tree-based adaptive key phrase extraction for intelligent Chinese information retrieval", special issue on "*Information Retrieval with Asian Language*", *Information Processing and Management,* 1998. Second, the corresponding English words are extracted from the English portion of the corpus 224 with word alignment information. The result is a candidate list of the Chinese-English bilingual terms. The list is evaluated and terms can be manually added to the bilingual dictionary 216.

To demonstrate the sentence recommendation tool 204, suppose a user inputs a sequence of Chinese characters. The character string is initially segmented into one or more words. The segmented word string acts as the user query that is passed to the query expansion 220. Morphologically modified words or other expanded word forms are returned from the query expansion 220 to the sentence recommendation tool 204.

Suppose that a user query is of the form multiple Chinese words $CW_1, CW_2, \ldots, CW_m$. All synonyms for each word of the queries are listed based on a Chinese thesaurus (not shown, but included as part of the query expansion component 220), as shown below.

$$
\begin{array}{cccc}
CW_{11} & CW_{21} & \cdots & CW_{m1} \\
CW_{12} & CW_{22} & \cdots & CW_{m2} \\
\cdots & \cdots & \cdots & \cdots \\
CW_{1n_1} & CW_{2n_2} & \cdots & CW_{mn_m}
\end{array}
$$

The query expansion 220 expands the query by substituting a word in the query with its synonym. To avoid over-generation, one implementation parameter is to restrict substitution to one word at each time.

As an example, suppose the query is "声音效果". The synonyms list is as follows:

声音=>〉声，音，音响，声响，响声，超声波，...

效果=>〉作用，功效，实效，...

The query consists of two words. Substituting the first word results in expanded queries, such as "声 效果", "音 效果", "音响 效果", etc. Substituting the second word yields expanded queries, such as "声音 作用", "声音 功效", "声音 实效", etc.

The sentence recommendation tool 204 selects an expanded query for use in retrieving example sentence pairs. One approach to selecting an appropriate query is to estimate the mutual information of words with the query as follows:

$$
\arg\max_{i,j} \sum_{\substack{k=1 \\ k \ne i}}^{m} MI(CW_k, CW_{ij}) \tag{6}
$$

Where $CW_k$ is the k-th Chinese word in the query, and $CW_{ij}$ is the j-th synonym of the i-th Chinese word. In the above example, "音响 效果" is selected. The selection, though statistically derived, is a reasonable choice in this instance.

The tool 204 passes the selected query to the sentence retrieval algorithm 222 to retrieve one or more pairs of bilingual sentences containing "音响 效果", All the retrieved sentence pairs are ranked based on a scoring strategy.

One implementation of a ranking algorithm will now be described. The input of the ranking algorithm is a query Q, which is a Chinese word string, as shown below:

$Q=T_1, T_2, T_3, \ldots T_k$

The output is a set of relevant bilingual example sentence pairs in the form of:

$S=\{(C\text{-}Sent, E\text{-}Sent)|\text{Relevance}(Q,C\text{-}Sent)>\delta \text{ or Relevance}(Q,E\text{-}Sent)>\delta\}$ where C-Sent is a Chinese sentence, and E-Sent is an English sentence in a bilingual sentence pair, and $\delta$ is a threshold.

For each sentence, the relevance score is computed in two parts: (1) a bonus that represents the similarity of the input query and the target sentence, and (2) a penalty that represents the dissimilarity of the input query and the target sentence.

The bonus is computed by the following formula:

$$
Bonus_i = \sum_{j=1}^{m} \log(W_j \times tf_{ij}) \times \log(n/df_j)/L_i
$$

where $W_j$ is the weight of the jth word in query Q (described below), $tf_{ij}$ is the number of times the jth word occurs in sentence i, n is the number of sentences in the corpus, $df_j$ is the number of sentences that contain Wj, and $L_i$ is the number of words in the ith sentence.

The above formula considers algebraic similarities. To account for geometric similarities, a penalty formula is used to derive an editing distance as a representation of geometric similarity.

Suppose the matched word list between query Q and a sentence are:

$R_i = Bonus_i - Penalty_i$ represented as A and B, respectively, $A_1, A_2, A_3, \ldots A_m$ $B_1, B_2, B_3, \ldots B_n$ The editing distance is defined as the number of editing operations to convert B to A. The penalty increases for each editing operation, but the score is different for different parts of speech. For example, the penalty is greater for verbs than nouns.

$$
Penalty_i = \sum_{j=1}^{h} \log(W'_j \times E_j) \times \log(n/df_j)/L_i
$$

where $W_j'$ is the penalty of the jth word and $E_j$ is the editing distance. The score and penalty for each kind of part-or-speech is defined in Table 1.

TABLE 1

| Part of Speech | Score | Penalty |
|---|---|---|
| Noun | 6 | 6 |
| Verb | 10 | 10 |
| Adjective | 8 | 8 |
| Adverb | 8 | 8 |
| Preposition | 8 | 8 |
| Conjunction | 4 | 4 |
| Digit | 4 | 4 |
| Digit-classifier | 4 | 4 |
| Classifier | 4 | 4 |
| Exclamation | 4 | 4 |
| Pronoun | 4 | 4 |
| Auxiliary | 6 | 6 |
| Post-reposition | 6 | 6 |
| Idioms | 6 | 6 |

The highest-ranking sentence pair is returned to the sentence recommendation tool 204 and suggested to the user via the UI 138. The user may then be better informed as to how the sentence should be constructed.

General Operation

Figure 4:
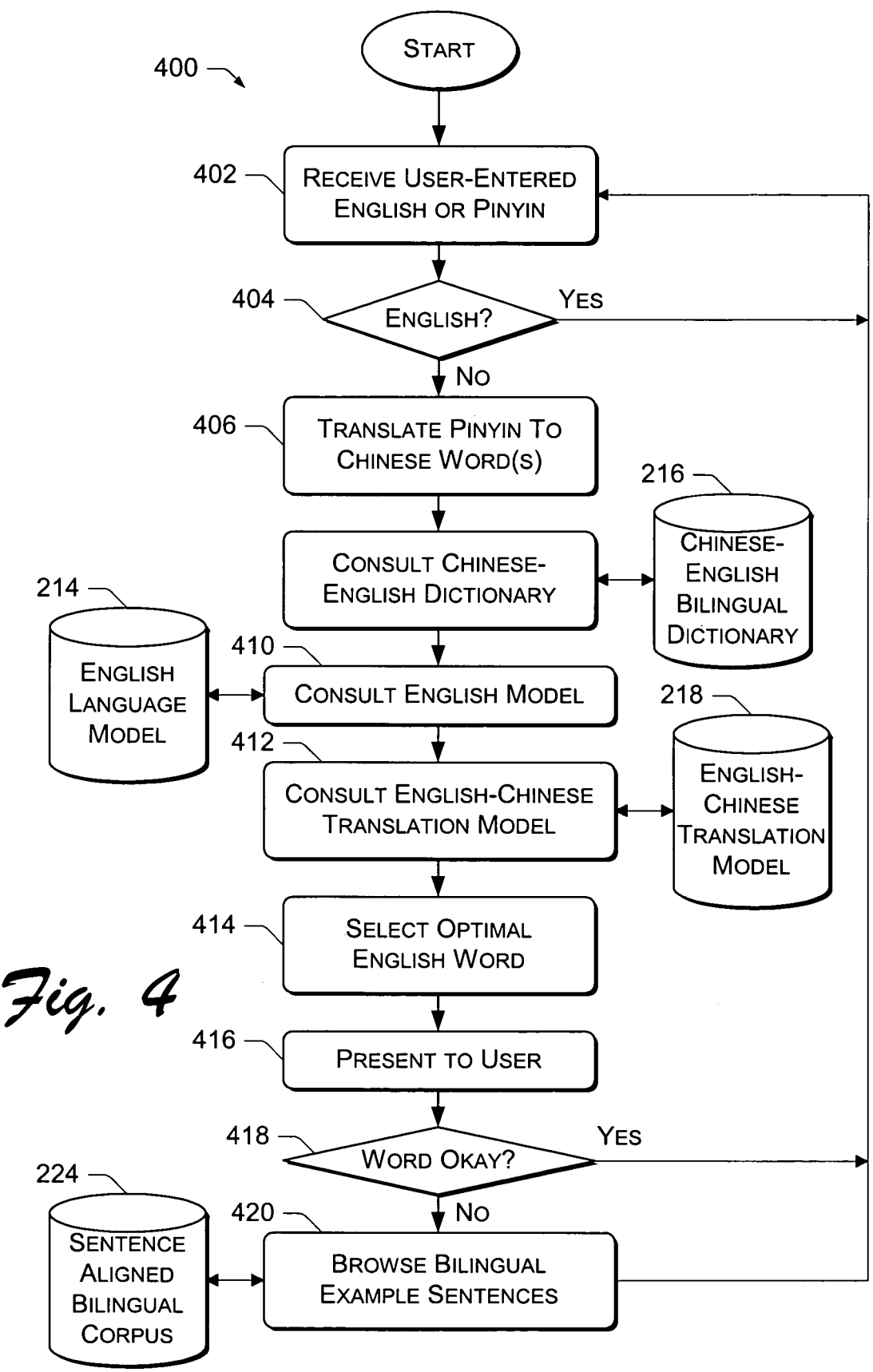
FIG. 4 is a flow diagram of a process for providing writing assistance to a user who is attempting to write in a non-native language.

FIG. 4 shows a general process 400 for assisting a user write non-native words, phrases, and sentences. The process is preferably implemented in software by the writing system, and particularly, the UI 138 and cross-language writing wizard 136. Accordingly, the process 400 may be implemented as computer-executable instructions that, when executed on a processing system such as CPU 102, performs the operations and task illustrated as blocks in FIG. 4. In keeping with the ongoing example implementation, the process is illustrated as pertaining to the Chinese-English writing environment, where English is the non-native language and Chinese is the native language. However, the process may be implemented in other languages.

At block 402, the UI 138 receives a user-entered string consisting of English and Pinyin characters. If the characters form an English word (i.e., the "yes" branch from block 404), the writing wizard offers little help because it assumes that the user is not experiencing any trouble writing and spelling English words. Conversely, when the user is unsure how to spell an English word or which English word to use, user can enter a Pinyin string. When Pinyin is received (i.e., the "no" branch from block 404), the spelling tool 200 receives the Pinyin and passes it to the Chinese Word/Pinyin translator 212.

At block 406, the translator 212 translates the Pinyin string to one or more Chinese words (e.g., Hanzi characters). The translator 212 selects the most likely Chinese word translation based on statistical probabilities learned previously from a training corpus. The translator 212 is also tolerant to errors entered by the user due to mistyping or misspelling.

At block 408, the translator 212 consults the Chinese-English dictionary 216 to determine possible English word translation candidates. At block 410, the translator 212 uses the English language model 214 to generate probabilities associated with the different English word candidates given the current sentence or phrase context. In one implementation, the English language model 214 generates probabilities $P(EW_{ij}|EW_1, EW_2)$, which are associated with the different English word candidates $EW_{ij}$ given the previous two words $EW_1$ and $EW_2$. At block 412, the translator 212 consults the English-Chinese translation model 218 to generate probabilities of how likely a Chinese word is intended given each of the English word candidates. For instance, the English-Chinese translation model 218 produces probabilities $P(CW_i|EW_{ij})$, identifying how likely a Chinese word $CW_i$ is intended given the various English word candidates $EW_{ij}$.

At block 414, the translator 212 uses the probabilities returned from the English language model and the English-Chinese translation model to determine the English word candidate with the highest probability of being the word intended by the user given the Pinyin string within the sentence context. The writing wizard 136 passes the optimal word back to the UI 138, which substitutes the English word for the Chinese Pinyin input string (block 416). To the user, the English word is essentially immediately substituted for the Pinyin string. The probability calculations are made at processing speeds that is negligible to the user.

If the user likes the English word (i.e., the "yes" branch from block 418), the user may simply continue writing more English words or Pinyin strings. On the other hand, if the user is still unsure of the English word, the user can invoke more assistance from the writing wizard via some predefined input, such as pressing the "ESC" key (i.e., the "no" branch from block 418).

In response to this user action, the writing wizard allows the user to see the English word in a sentence context to learn how the word can be used (block 420). The user can invoke a window with example bilingual sentence pairs extracted from the bilingual corpus 224 that contain the English word. In addition, the wizard presents a list of other Chinese word translations of the Pinyin string, as well as a list of other English word candidates. The user can select any one of these words and review the selected word in an example pair of bilingual sentences.

Writing Wizard User Interface

The remaining discussion is directed to features of the user interface 138 when presenting the writing wizard. In particular, the writing wizard user interface 138 allows user entry of bilingual words from a non-native language and a native language within the same entry line on the screen. Many of the features are described in the context of how they visually appear on a display screen. It is noted that such features are supported by the user interface 138 alone or in conjunction with an operating system.

FIGS. 5–15 show exemplary writing wizard user interfaces implemented as graphical UIs (GUIs) that are presented to the user as part of a word processing program or other computer-aided writing system. Odd FIGS. 5, 7, 9, 11, and 13 present a generic graphical user interface (GUI) to illustrate various features of the writing wizard user interface. Even FIGS. 6, 8, 10, 12, and 14 present a specific GUI for a Chinese-English machine writing system that corresponds to the generic user interface of FIGS. 5, 7, 9, 11, and 13.

Figure 5:
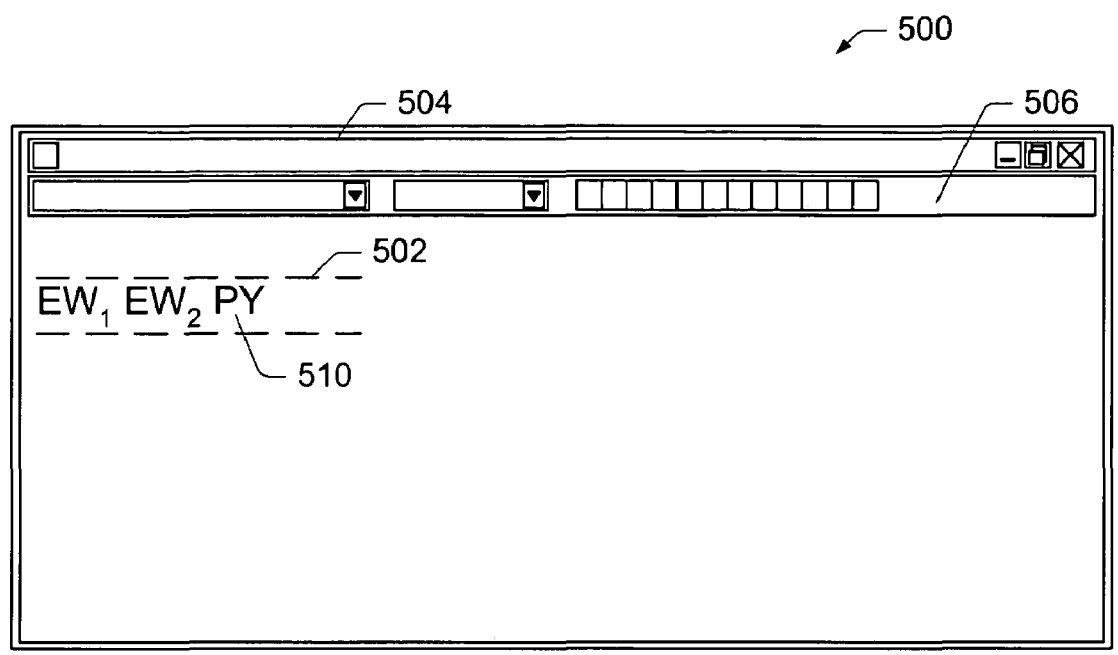
FIG. 5 is a diagrammatic illustration of a screen display of a user interface for the writing system.

FIG. 5 shows a screen display 500 presented by the language input UI 138 alone, or in conjunction with an operating system. In this illustration, the screen display 500 resembles a customary graphical window, such as those generated by Microsoft's Windows-brand operating system. The graphical window is adapted for use in the context of language input, and presents an in-line input area 502 in which non-native and native words may be entered by the user. The in-line area 502 is represented pictorially by the parallel dashed lines. An input cursor (not shown) may be used to mark the present position of data entry.

The graphical UI may further include a plurality of tool bars, such as tool bars 504 and 508, or other functional features depending on the application (e.g., word processor, data processor, spread sheet, internet browser, email, operating system, etc.). Tool bars are generally known in the word or data processing art and will not be described in detail.

In FIG. 5, the user has entered two non-native words $EW_1$ and $EW_2$. For discussion purpose, symbol "EW" is used throughout the odd figures to represent a non-native word, such as an English Word, that has been input and displayed in the UI. When the user is uncertain how to spell the next non-native word, the user simply enters the corresponding word in his/her native language. In this example, the Chinese user enters Chinese Pinyin character PY at position 510 in the same entry area 502. The Chinese user enters Pinyin rather than Chinese words (e.g., Hanzi characters) because Pinyin can be conveniently entered using a standard QWERTY keyboard or voice recognition system. Pinyin is an example of phonetic text and Hanzi is an example of language text.

Figure 6:
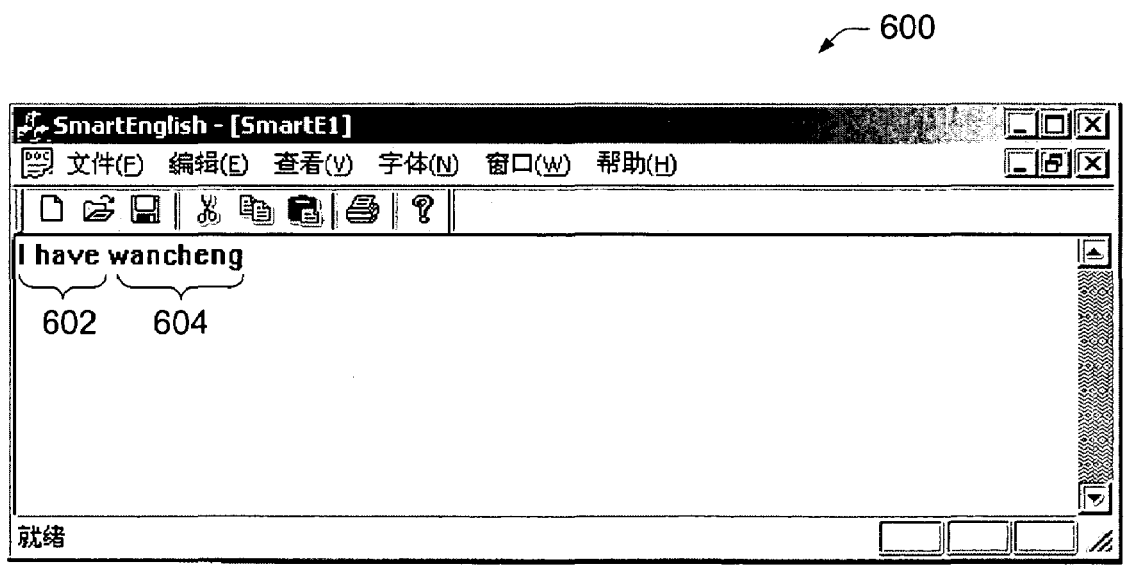
FIG. 6 is a screen display corresponding to the FIG. 5 display that is adapted for a Chinese-English version of the writing system.

FIG. 6 shows an example GUI 600 that corresponds to FIG. 5. The GUI 600 shows two English words 602 (e.g., "I have") followed by a Pinyin string 604 (e.g., "wancheng").

After entering the native word (e.g., Pinyin) and pressing the "SPACE" key (or some other actuation), the cross-language wizard 136 automatically recognizes that the current input is a native word and not a non-native word. The spelling tool 202 converts the native word to a corresponding non-native word. If the native word is slightly misspelled or entered incorrectly, the spelling tool tolerates the errors and returns the most probable non-native word. The non-native word is then depicted in the in-line entry area 502 in place of the native word.

Figure 7:
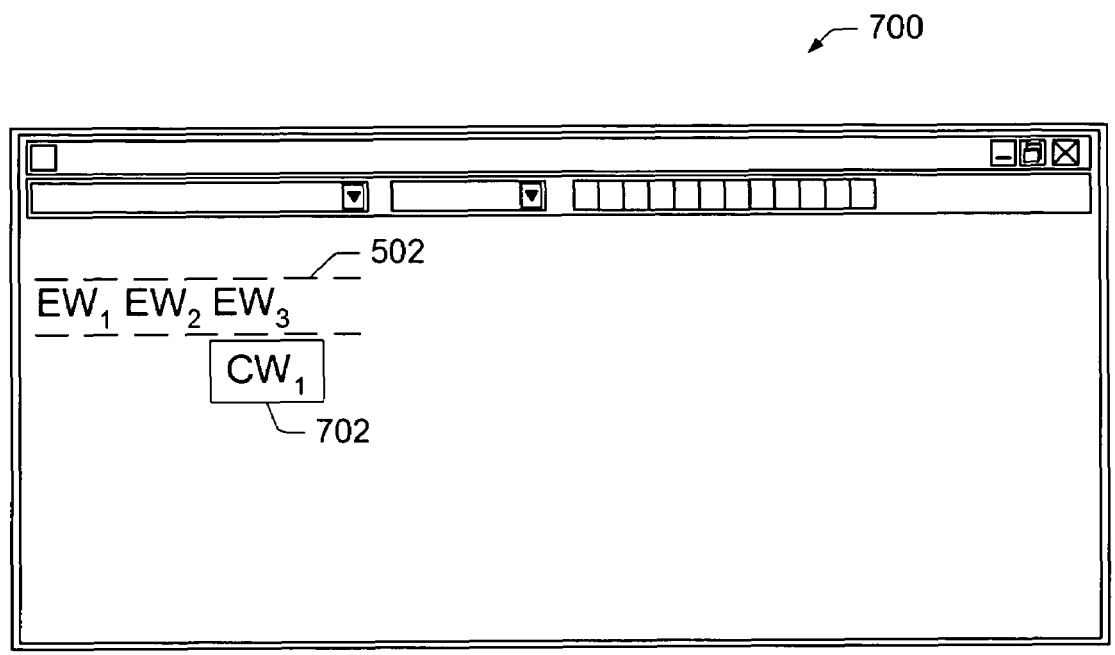
FIG. 7 is a diagrammatic illustration of a screen display of the writing system UI that depicts automatic conversion from an input string in a native language (e.g., Pinyin) to a non-native word (e.g., English).

FIG. 7 shows a screen display 700 presented by the language input UI 138 after the native word (e.g., PY) is converted to, and replaced with, a corresponding non-native word $EW_3$. For each native input string, there may be more than one possible interpretation in the native language. The writing wizard uses the statistical approach described above to determine the most likely translation. As a result, the input string is first translated to corresponding words in the native language, and then the most probable native word is selected for subsequent translation into non-native words.

The most likely native word, represented as $CW_1$, is shown beneath the converted non-native word $EW_3$ in a pop-up box 702. The user can view the native word box 702 to determine whether the translation is the one he/she intended.

Figure 8:
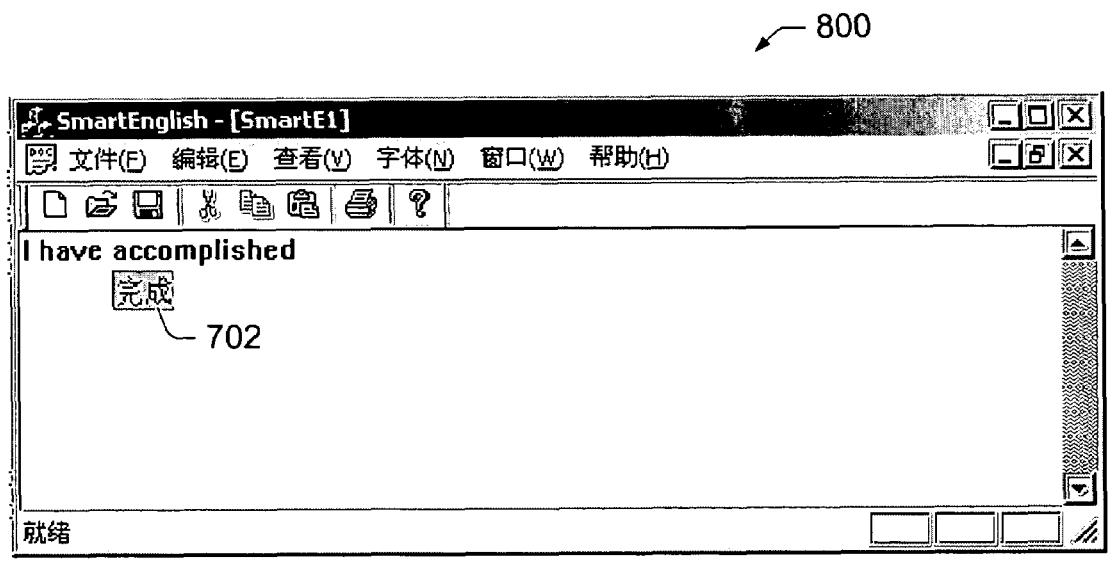
FIG. 8 is a screen display corresponding to the FIG. 7 display that is adapted for a Chinese-English version of the writing system.

FIG. 8 shows an example GUI 800 that corresponds to FIG. 7. The GUI 800 shows the two English words "I have" followed by a third English word "accomplished", which is translated from the Pinyin input string "wancheng" (FIG. 6). Beneath the translated word "accomplished" is a pop-up box 702 with the Chinese word "完成".

In Chinese, the mapping from Pinyin to Chinese words is one-to-many, meaning that one Pinyin string may be translated to many different Chinese words. In addition, one Chinese word maps to many different English words. The pop-up box 702 contains the most probable Chinese Hanzi word from which the Pinyin was initially translated. This Chinese word was then translated to the English word "accomplished".

If the user agrees with the English word, the user simply continues entering English words within the in-line entry area. On the other hand, if the user is not satisfied with the English word, the writing wizard 136 allows the user to change the selection via some user input, such as pressing the "ESC" key.

Figure 9:
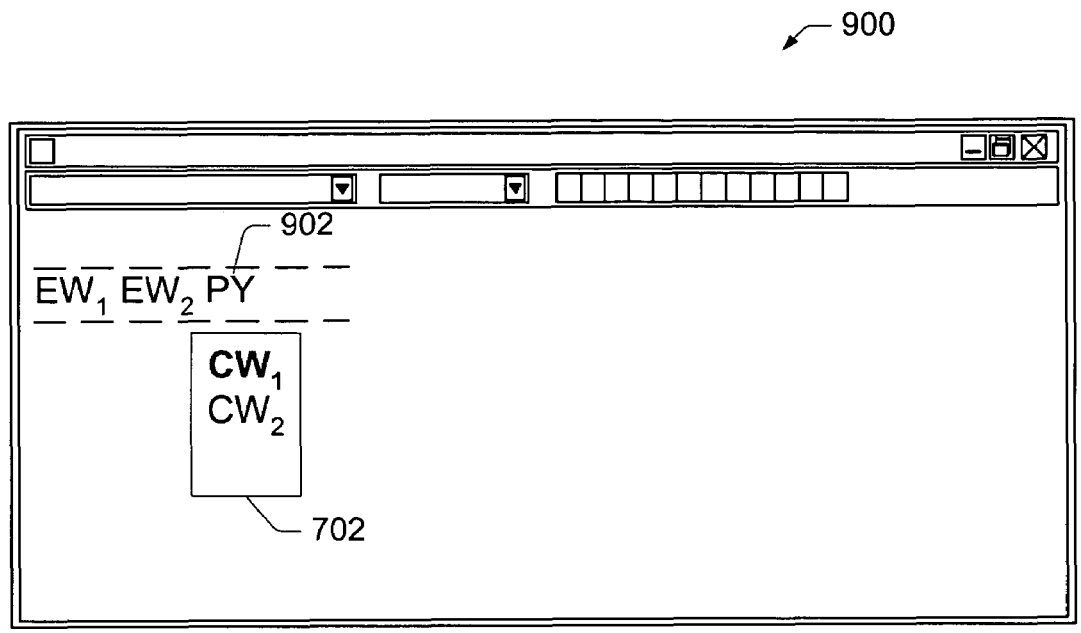
FIG. 9 is a diagrammatic illustration of a screen display of the writing system UI that depicts alternative translations of the input string within the native language (e.g., alternative Chinese words translated from the Pinyin).

FIG. 9 shows a screen display 900 presented by the language input UI 138 in response to the user pressing the "ESC" key (or some other cue) to change the selection. The writing wizard 136 restores the native input string PY at location 902, thereby replacing the automatically selected non-native word $EW_3$ (FIG. 7).

The pop-up box 702 is expanded to include other possible translation of the input string, as represented by $CW_1$ and $CW_2$. The most probable word $CW_1$ is positioned at the top and initially highlighted to indicate that it is statistically the most likely translation. The second most likely word $CW_2$ is listed beneath the most probable word. The user can select any one of the possible translations using conventional focus-and-select techniques (e.g., scrolling and entering, point-and-click, arrow and space keys, etc.).

Figure 10:
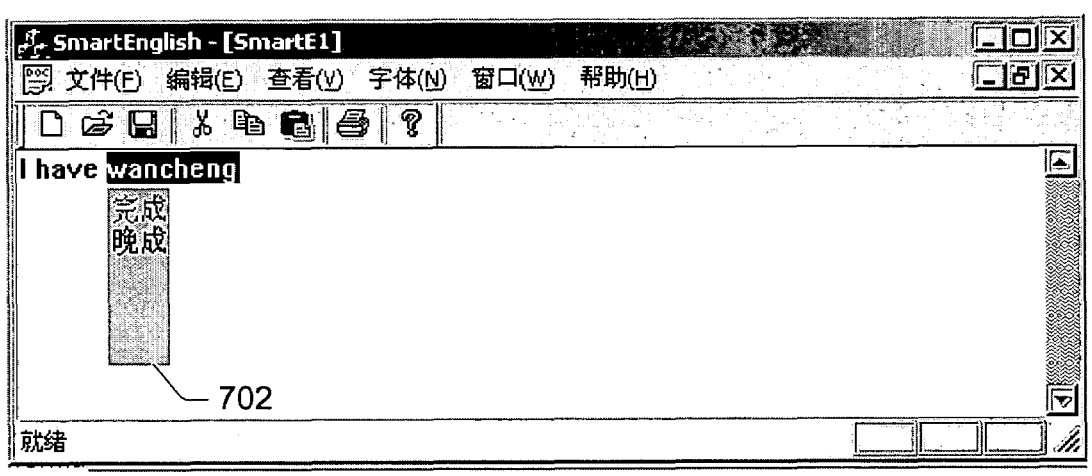
FIG. 10 is a screen display corresponding to the FIG. 9 display that is adapted for a Chinese-English version of the writing system.

FIG. 10 shows an example GUI 1000 that corresponds to FIG. 9. The GUI 1000 shows the Pinyin input string "wancheng" restored in place of the English word "accomplished". Beneath the Pinyin input string "wancheng" is the pop-up box 702 with two Chinese words.

Figure 11:
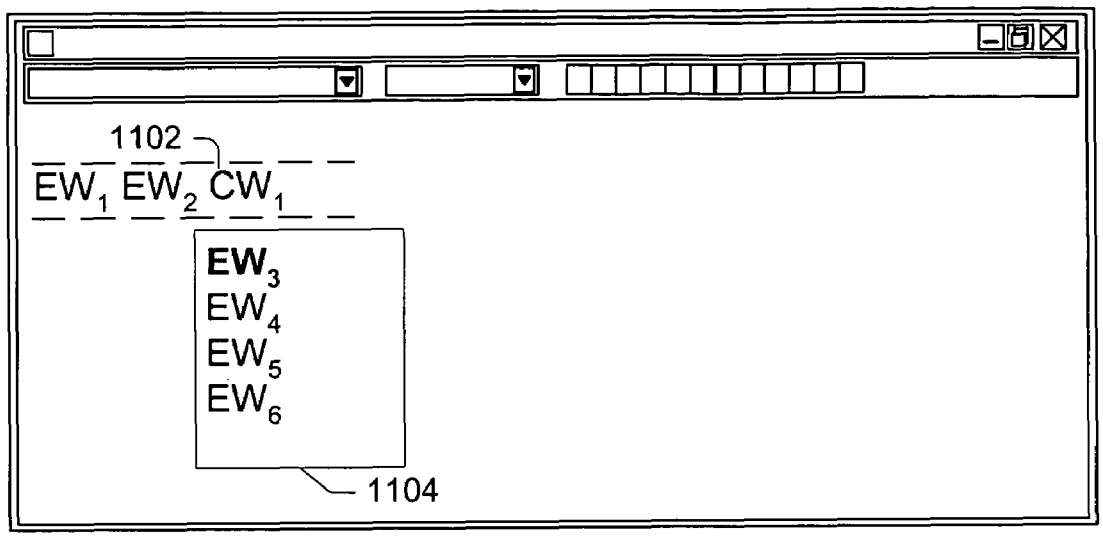
FIG. 11 is a diagrammatic illustration of a screen display of the writing system UI that depicts alternative translations of non-native words based on a elected native word (e.g., possible English words corresponding to a Chinese word).

FIG. 11 shows a screen display 1100 presented by the language input UI 138 in response to the user selecting the first-listed native word $CW_1$. The native word $CW_1$ replaces the input string PY at location 1102. A second pop-up box 1104 is also presented that contains one or more possible non-native translations $EW_3$, $EW_4$, $EW_5$, and $EW_6$ from the native word $CW_1$. The top-listed candidate, $EW_3$, is highlighted or otherwise identified in the box 1104. This candidate may initially be the most likely candidate. The user may browse the box 1104 to select a more desired non-native translation using standard navigation techniques (e.g., point-and-click, arrows and space/return keys, etc.).

Figure 12:
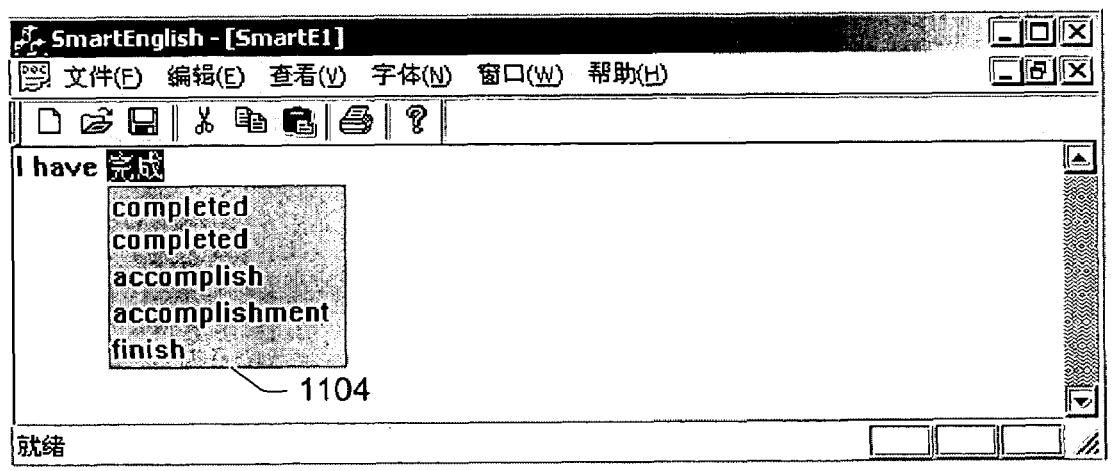
FIG. 12 is a screen display corresponding to the FIG. 11 display that is adapted for a Chinese-English version of the writing system.

FIG. 12 shows an example GUI 1200 that corresponds to FIG. 11. The GUI 1200 shows the Chinese word "完成" substituted for the Pinyin input string "wancheng". Beneath the Chinese word is the pop-up box 1104 with five alternative English words. More or less words may be presented within the box 1104. The user can scroll the box 1104 using conventional navigation tools, such as up/down arrow keys and a scroll bar.

If the user is still unsure of the correct English word, the user can invoke further assistance from the writing wizard by requesting a sample sentence that uses the English word. The user moves the focus to a desired word in the pop-up English word box 1104 and presses a keyboard key (e.g., the right arrow key) to invoke a window that contains a sample sentence.

Figure 13:
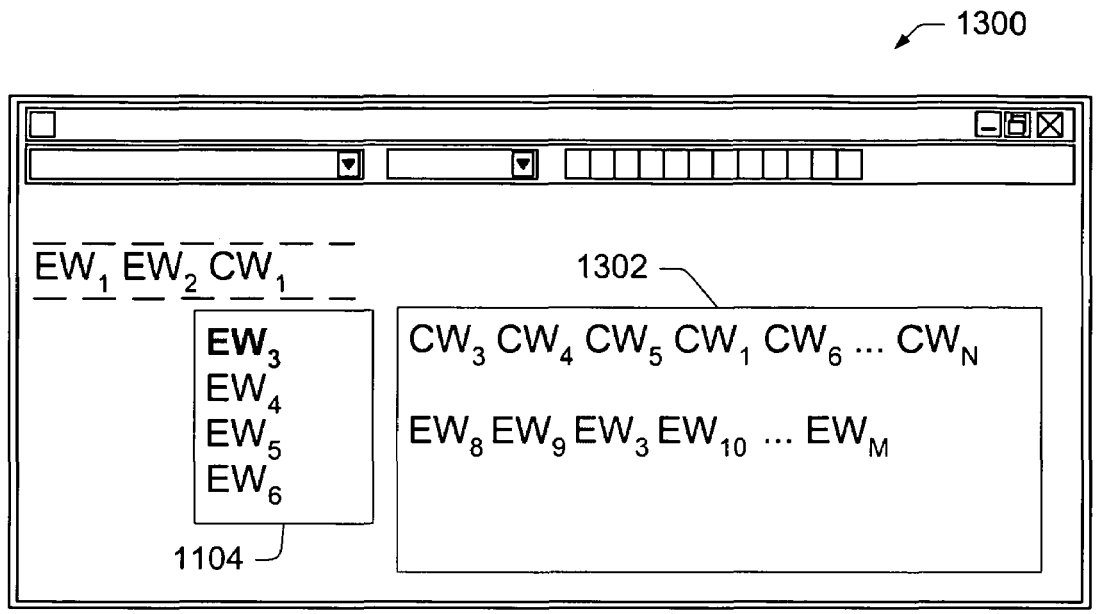
FIG. 13 is a diagrammatic illustration of a screen display of the writing system UI that depicts sample bilingual sentences using a selected non-native word.

FIG. 13 shows a screen display 1300 presented by the language input UI 138 in response to the user placing the focus on the non-native word $EW_3$ in box 1104 and invoking a sample sentence window 1302. The window 1302 presents a bilingual sentence pair that contains a sentence written in native words $CW_3$, $CW_4$, ... $CW_N$ and a corresponding sentence written in non-native words $EW_8$, $EW_9$, ... $EW_M$. The native word $CW_1$ and the corresponding non-native word $EW_3$ that is the subject of the bilingual sentence sample are highlighted or otherwise identified (e.g., italics, bold, etc.). The bilingual sample sentences help the user better understand how the non-native word is used in a particular context.

Figure 14:
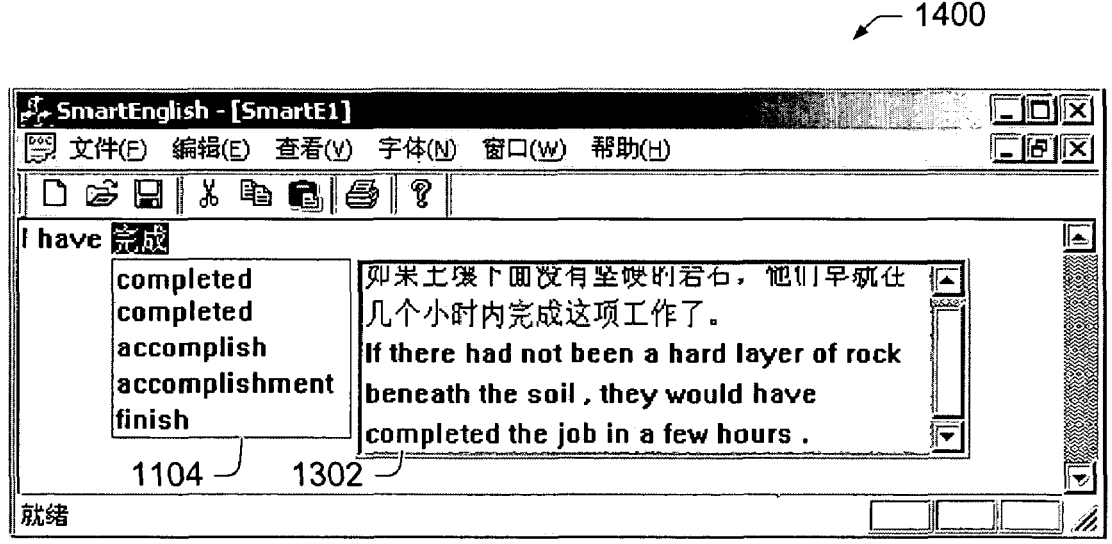
FIG. 14 is a screen display corresponding to the FIG. 13 display that is adapted for a Chinese-English version of the writing system.

FIG. 14 shows an example GUI 1400 that corresponds to FIG. 13. The GUI 1400 shows the pop-up box 1104 and a sample sentence window 1302 that uses the English word "completed" in a sentence. In this example, the English sentence reads "If there had not be a hard layer of rock beneath the soil, they would have completed the job in a few hours." The corresponding Chinese sentence written in Hanzi text is presented above the English sentence.

After the user better understands the English word, and how it can be used in a sentence, the user can confirm entry of a suitable English word. Upon confirmation, the English word is substituted for the Chinese word following the two English words. The UI will then present only the three English words "I have completed", and the two pop-up windows 1104 and 1302 will be removed.

Sentence Assistance

The user may want help on how to construct a sentence properly. The writing wizard allows the user to enter a phrase or sentence directly. For instance, suppose the user enters the following Chinese phrase (either directly or via Pinyin input converted to Chinese words):

提供机会|

The user can then invoke the sample bilingual sentence window 1302 directly by pressing the "ESC" key, or by some other means.

Figure 15:
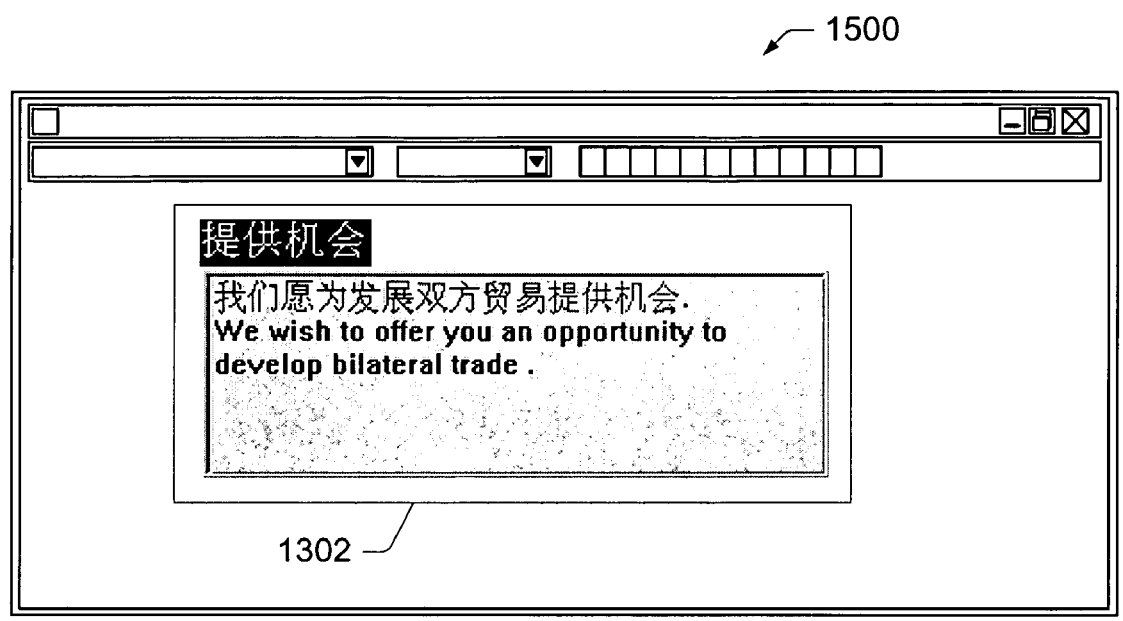
FIG. 15 is a diagrammatic illustration of a screen display of the writing system UI that depicts sample bilingual sentences invoked directly in response to user entry of native language text.

FIG. 15 shows a screen display 1500 presented by the language input UI 138 in response to the user entering the Chinese phrase and directly invoking the sentence window 1302. A corresponding pair of sentences-one in Chinese and one in English—that utilizes the Chinese phrase and English equivalence is presented in the window 1302. The subject phrases are highlighted or otherwise identified in the sentences.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer-implemented method for a providing assistance to a non-native speaker in preparing written text in a native language, the method comprising:
    receiving non-native words of a non-native language and at least one native word of a native language that are entered by a user;
    identifying at least one non-native word corresponding in meaning to the native word; and
    converting the native word to a corresponding non-native word.

2. A method as recited in claim 1, wherein the non-native language is English and the native language is Chinese.

3. A method as recited in claim 1, wherein the non-native words are English words and the native word is Chinese Pinyin.

4. A method as recited in claim 1, wherein the native word is written in phonetic text.

5. A method as recited in claim 1, further comprising displaying the non-native words and the native word within a common entry line.

6. A method as recited in claim 1, wherein the converting comprises determining a most probable non-native word given a context established by the non-native words previously entered by the user.

7. A method as recited in claim 1, wherein the native word is entered in phonetic form, the converting further comprising:
    translating the native word from the phonetic form to a language form; and
    translating the native word in the language form to the non-native word.

8. A method as recited in claim 1, wherein the native word is entered in phonetic form, the converting further comprising:
    determining a most probable language form of the native word and translating the native word from the phonetic form to the most probable language form; and
    determining a most probable non-native word given the most probable language form of the native word.

9. A method as recited in claim 1, wherein the native word is entered in phonetic form and the converting comprises translating the native word from the phonetic form to one or more native words in a language form, the method further comprising displaying the one or more native words in the language form.

10. A method as recited in claim 9, further comprising:
    displaying the non-native words and the phonetic form of the native word within a common entry line; and
    displaying the one or more native words in the language form within a pop-up box adjacent the entry line.

11. A method as recited in claim 10, further comprising ordering the native words within the pop-up box according to probabilities.

12. A method as recited in claim 10, further comprising enabling a user to scroll within the pop-up box.

13. A method as recited in claim 1, wherein the native word is entered in phonetic form and the converting comprises:
    translating the native word from the phonetic form to one or more native words in a language form;
    displaying the one or more native words in the language form;
    translating at least one of the native words in the language form to one or more non-native words; and
    displaying the one or more non-native words.

14. A method as recited in claim 13, further comprising:
    displaying the non-native words and the phonetic form of the native word within a common entry line; and
    displaying the one or more native words in the language form within a pop-Up box adjacent the entry line.

15. A method as recited in claim 13, further comprising:
    following translation to the one or more non-native words, displaying the non-native words and the language form of the native word within a common entry line; and
    displaying the one or more non-native words within a pop-up box adjacent the entry line.

16. A method as recited in claim 1, further comprising displaying a bilingual sentence pair having a native sentence written in the native language and including the native word and a corresponding non-native sentence written in the non-native language and including the non-native word.

17. One or more computer-readable media having computer-executable instructions that, when executed on a processor, direct a computer to perform the method as recited in claim 1.

18. A computer-based method for providing assistance to a speaker of a second language in preparing written text in a first language, the method comprising:
    displaying, via a user interface, character strings in a first language together with at least one character string of a second language as the user enters the character strings;
    identifying at least one character string in the first language corresponding in meaning to the character string of the second language;
    converting the character string of the second language to an other character string of the first language; and
    replacing the character string of the second language with said other character string of the first language in the user interface.

19. A method as recited in claim 18, wherein the first language is English and the second language is Chinese.

20. A method as recited in claim 18, further comprising displaying the character strings of the first and second languages within a common entry line.

21. A method as recited in claim 18, wherein the converting comprises determining a most probable character string given a context established by the character strings previously entered by the user.

22. One or more computer-readable media having computer-executable instructions that, when executed on a processor, direct a computer to perform the method as recited in claim 18.

23. A method comprising:
    receiving non-native words of a non-native language and at least one native word of a native language, the native word being received in a first form of the native language;
    translating the native word from its first form to at least one native word of a second form; and
    translating the native word of the second form to at least one non-native word.

24. A method as recited in claim 23, wherein the non-native language is English and the native language is Chinese.

25. A method as recited in claim 23, wherein the non-native words are English words and the first form of the native word is Chinese Pinyin and the second form of the native word is Chinese Mandarin.

26. A method as recited in claim 23, wherein the translating the native word from its first form comprises selecting a most likely native word of the second form based on statistical probabilities.

27. A method as recited in claim 23, further comprising accepting misspelled versions of the native word in the first form.

28. A method as recited in claim 23, further comprising displaying the non-native words and the native word within a common entry line.

29. A method as recited in claim 23, wherein the translating the native word from its second form to the non-native word comprises:
   determining possible non-native word candidates from the second form of the native word;
   a generating first probabilities associated with the non-native word candidates that indicate how likely individual non-native word candidates were intended by the user given the context established by previously entered non-native words;
   generating second probabilities associated with the non-native word candidates that indicate how likely the second form of the native word was intended given individual non-native word candidates; and
   deriving a most probable non-native word from among the non-native word candidates based on the first and second probabilities.

30. A method as recited in claim 23, further comprising replacing the native word in its first form with the non-native word.

31. One or more computer-readable media having computer-executable instructions that, when executed on a processor, direct a computer to perform the method as recited in claim 23.

32. A method comprising:
   enabling a user to enter non-native words of a non-native language and a phonetic text string of a native language;
   displaying the non-native words and the phonetic text string within a common entry line;
   translating the phonetic text string to at least one native word of the native language;
   determining possible non-native word candidates from the native word of the native language;
   generating first probabilities associated with the non-native word candidates that indicate how likely individual non-native word candidates were intended by the user given the context established by previously entered non-native words;
   generating second probabilities associated with the non-native word candidates that indicate how likely the native word was intended given individual non-native word candidates;
   deriving a most probable non-native word from among the non-native word candidates based on the first and second probabilities; and
   translating the native word to the most probable non-native word.

33. A method as recited in claim 32, wherein the non-native language is English and the native language is Chinese.

34. A method as recited in claim 32, wherein the non-native words are English words, the phonetic text is Chinese Pinyin, and the native word is Chinese Hanzi.

35. A method as recited in claim 32, wherein the translating the phonetic string comprises selecting most likely native words based on statistical probabilities.

36. A method as recited in claim 32, wherein the determining comprises using a bilingual dictionary to identify the non-native word candidates.

37. A method as recited in claim 32, wherein the generating first probabilities comprises using a statistical language model.

38. A method as recited in claim 32, wherein the generating second probabilities comprises using a translation model.

39. A method as recited in claim 32, further comprising displaying the most probable non-native word in place of the phonetic text string.

40. One or more computer-readable media having computer-executable instructions that, when executed on a processor, direct a computer to perform the method as recited in claim 32.

41. A cross-language input user interface for providing assistance to a non-native speaker in preparing written text in a native language, comprising:
   a line-based entry area;
   non-native text displayed within the line-based entry area;
   native text displayed together with the non-native text within the line-based entry area;
   indication of the native text to facilitate replacement with non-native text corresponding in meaning to the native next; and
   converted non-native text, converted from the native text, substituted for the native text within the line-based entry area.

42. A cross-language input user interface as recited in claim 41, wherein the non-native text comprises English and the native text comprises Chinese.

43. A cross-language input user interface as recited in claim 41, wherein the line-based entry area is oriented horizontally.

44. A cross-language input user interface as recited in claim 41, further comprising a candidate list of non-native words that are possible translations of the native text.

45. A cross-language input user interface as recited in claim 41, further comprising a candidate list of non-native words that are possible translations of the native text, the non-native words being ordered within the candidate list according to a ranking.

46. A cross-language input user interface as recited in claim 41, wherein the line-based entry area is oriented in a first direction and further comprising a candidate list of non-native words that are possible translations of the native text, the candidate list being oriented in a second direction orthogonal to the first direction.

47. A cross-language input user interface as recited in claim 41, further comprising a sentence window, invokable by a user, to present bilingual sentences that include the native text and the non-native text.

48. A word processor comprising the language input user interface as recited in claim 41.

49. A cross-language input user interface for providing assistance to a speaker of a second language In preparing written text in a first language, comprising:

an entry area that accepts first words written in a first language and at least one second word written in a second language;

indication of the second word to facilitate replacement with at least one first word in the first language corresponding in meaning to the second word in the second language; and a candidate list of first words that are possible translations from the second word.

50. A cross-language input user interface as recited in claim 49, wherein the first language is English and the second language is Chinese.

51. A cross-language input user interface as recited in claim 49, wherein the entry area comprises a line-based entry area oriented in a first direction and the candidate list is presented adjacent the line-based entry area and oriented in a second direction orthogonal to the first direction.

52. A cross-language input user interface as recited in claim 49, further comprising a sentence window, invokable by a user, to present bilingual sentences written in the first and second languages.

53. A word processor comprising the language input user interface as recited in claim 49.

54. A cross-language writing architecture for providing assistance to a non-native sneaker in preparing written text in a native language, comprising;

a user interface to enable a user, who is accustomed to a native language, to:

enter a native word in the native language;

recognize entry of the native word;

provide at least one non-native word corresponding in meaning to the native word;

enter non-native words from a non-native language; and a spelling tool to assist the user with correct entry of the non-native words.

55. A cross-language writing architecture as recited in claim 54, wherein the user interface allows the user to enter a native word from the native language instead of the non-native word, the spelling tool comprising a translator to translate the native word to a corresponding non-native word.

56. A cross-language writing architecture as recited in claim 55, wherein the translator utilizes a bilingual dictionary.

57. A cross-language writing architecture as recited in claim 55, wherein the translator utilizes a statistical language model.

58. A cross-language writing architecture as recited in claim 55, wherein the translator utilizes a bilingual translation model.

59. A cross-language writing architecture as recited in claim 54, wherein the spelling tool utilizes a thesaurus.

60. A word processor comprising the language input architecture as recited in claim 54.

61. A cross-language writing architecture comprising:

a user interface to enable a user, who is accustomed to a native language, to enter non-native words from a non-native language; and a sentence recommendation tool to suggest possible sentence structures in the non-native language.

62. A cross-language writing architecture as recited in claim 61, wherein the sentence recommendation tool comprises:

a bilingual corpus containing bilingual sentence pairs written in both the native language and the non-native language; and a sentence retrieval unit to retrieve bilingual sentence pairs from the bilingual corpus.

63. A cross-language writing architecture as recited in claim 62, wherein the sentence recommendation tool ranks the sentences retrieved from the bilingual corpus.

64. A word processor comprising the language input architecture as recited in claim 61.

65. A cross-language writing architecture comprising:

a user interface to enable entry of English words together with Chinese Pinyin;

a spelling tool to translate the Chinese Pinyin to one or more Chinese words, the spelling tool being further configured to translate the Chinese words to one or more English words that may be substituted for the Chinese Pinyin; and a sentence recommendation tool, invokable by a user, to offer pairs of corresponding sentences written in English and Chinese to demonstrate how an English word is used in a sentence.

66. A cross-language writing architecture as recited in claim 65, wherein the spelling tool comprises:

a Chinese-English dictionary to determine possible English word candidates from the Chinese words;

an English language model to determine how likely the user intended the English word candidates given previously entered English words; and an English-Chinese translation model to determine how likely individual Chinese words were intended given the English word candidates.

67. A cross-language writing architecture as recited in claim 65, wherein the sentence recommendation tool comprises:

a bilingual corpus containing bilingual sentence pairs written in both English and Chinese; and a sentence retrieval unit to retrieve bilingual sentence pairs from the bilingual corpus.

68. A word processor comprising the language input architecture as recited in claim 65.

69. One or more computer-readable media having computer-executable instructions that, when executed on a processor, direct a computer to:

enable entry of English words and Chinese Pinyin;

translate the Chinese Pinyin to at least one Chinese word;

determine possible English word candidates from the Chinese word;

generate first probabilities associated with the English word candidates that indicate how likely each of the English word candidates was intended given previously entered English words;

generate second probabilities associated with the English word candidates that indicate how likely the Chinese word was intended given each of the English word candidates;

derive a most probable English word from among the English word candidates based on the first and second probabilities; and translate the Chinese word to the most probable English word.

* * * * *